May 2, 1933.  C. A. SWART  1,907,015

ANTIFRICTION BEARING

Filed Nov. 19, 1931

INVENTOR
Clarence A. Swart
BY
Bodell & Thompson
ATTORNEYS.

Patented May 2, 1933

1,907,015

UNITED STATES PATENT OFFICE

CLARENCE A. SWART, OF SYRACUSE, NEW YORK, ASSIGNOR TO ROLLWAY BEARING COMPANY INC., OF SYRACUSE, NEW YORK, A CORPORATION OF NEW YORK

ANTIFRICTION BEARING

Application filed November 19, 1931. Serial No. 576,032.

This invention relates to anti-friction bearings which include rolling elements, as an annular series of balls or rollers, and has for its object a soluble cage in which the rolling elements, as balls or rollers, are assembled in an annular series before being inserted in the raceways and also a method of assembling balls or rollers in the raceways.

The invention consists in the novel features and in the combinations and construction and also in the method hereinafter set forth and claimed.

In describing this invention, reference is had to the accompanying drawing in which like characters designate corresponding parts in all the views.

Figure 1:
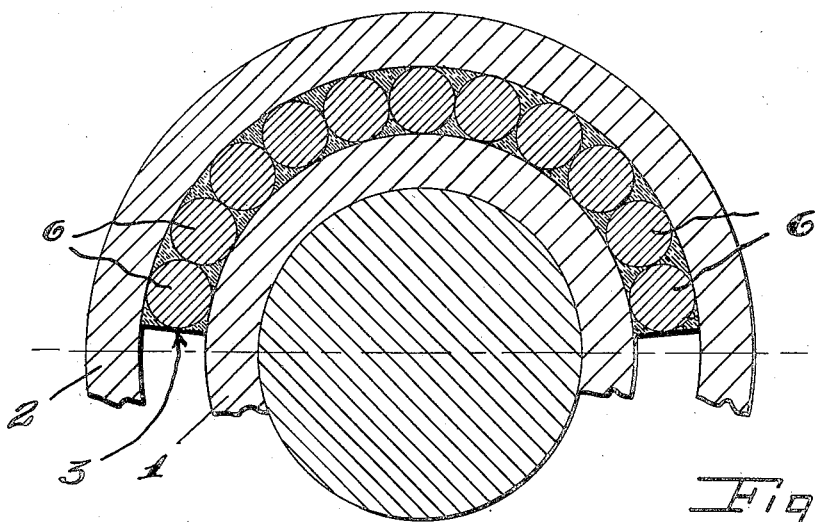
Figure 1 is an enlarged fragmentary sectional view of a bearing embodying this invention.
Figure 4:
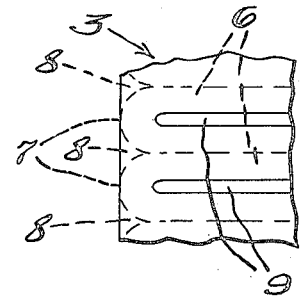
Figure 4 is a fragmentary detail view of the cage.
Figure 2:
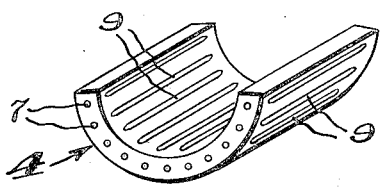
Figure 2 is an isometric view of one of the arcuate segments of the soluble cage with the rollers inserted therein.
Figure 3:
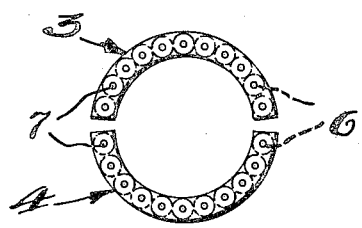
Figure 3 is an end view of a cage composed of two segments showing the same prior to insertion in the raceways.

In assembling the balls or rollers of small diameter in the raceways, that is, balls or rollers too small to permit the use of the metal cage, the rollers must be assembled in the raceways one by one, and this manner of assembly is comparatively long and tedious and bearing manufacturers have long sought a quick and economical method of assembling balls or rollers of small diameter in the raceways. By my invention, the balls or rollers are held in juxtaposition in a cage of a material easily soluble in a liquid that has no effect on metal and is strong enough to hold in shape during handling and shipment, and particularly, a cage that is soluble in lubricating oil so that the rollers are first assembled in the soluble cage and then afterwards readily placed in the bearing. The rollers themselves may be made by one manufacturer or in one department and then shipped to another manufacturer or another department, where they are assembled in the bearing and by my invention, the rollers are formed in the soluble cage by one manufacturer or by one department and thus shipped ready to be inserted in the bearing. The cages are usually formed or molded in arcuate segments. The cage is formed of waxy substance readily soluble in a hydrocarbon or lubricating oil, and the waxes used are what are known as pentichloride naphthalene, bee's wax and carnuba wax, etc. and preferably, the balls or rollers are embedded in the wax adjacent each other, the cage serving as a lubricant initially until it is dissolved and displaced by the lubricating oil. The wax will not soften at atmospheric temperature and is stiff enough to hold the assembly in shape during handling and shipping.

1 and 2 designate the inner and outer raceways. 3 and 4 designate arcuate segments of a cage having rollers 6 embedded therein, the segments being substantially of the radius of the bearing in which the rollers are to be ultimately used. The rollers are thus embedded in form and of a radius substantially the same as that of the raceways in which the rollers are to be inserted. The method therefor consists in embedding the rolling elements as balls or rollers in a wax that is easily soluble in liquid, that is ineffective on metal, as lubricating oil and then placing the cage, as a unit, in the raceways.

Usually the rollers are formed with rounding or chamfered ends 7 and the wax around adjacent rollers joined by thick connecting pieces of wax at 8 at the ends of the rollers. Even though the rollers break through as at 9, the thin films of wax around the periphery and inner cylindrical wall of the cage are soft to hold the rollers from displacement in the cage. This soluble cage is particularly designed for small rollers of one-eighth inch or less diameter.

What I claim is:

1. An anti-friction bearing including a series of rolling elements and a self supporting cage for said elements soluble in lubricating oil.

2. An anti-friction bearing including a series of rolling elements and a self supporting cage in which said elements are initially embedded, said cage being of a material soluble in a hydrocarbon.

3. An anti-friction bearing including a series of rolling elements and a self supporting cage in which said elements are initially embedded, said cage being of a material soluble in a liquid which is ineffective on metal.

4. An anti-friction bearing including a series of rolling elements and a self supporting cage consisting of arcuate segments for initially holding said elements assembled, the segments being formed of a material soluble in a liquid ineffective on metal.

5. An anti-friction bearing including a series of rolling elements and a self supporting cage consisiting of arcuate segments for initially holding said elements assembled, the segments being formed of wax soluble in lubricating oil.

6. The method of assembling rolling elements in an anti-friction bearing consisting in holding the elements in arcuate formation in a cage composed of solid material soluble in a liquid which is ineffective on metal and placing the cage in the bearing.

7. The method of assembling rolling elements in an anti-friction bearing consisting in embedding the elements in a cage composed of material soluble in lubricating oil and then inserting the cage in position in the bearing.

In testimony whereof, I have hereunto signed my name, at Syracuse, in the County of Onondaga, and State of New York, this 13th day of November, 1931.

CLARENCE A. SWART.